No. 709,140. Patented Sept. 16, 1902.
D. DAGGETT.
CALF WEANER.
(Application filed June 6, 1902.)
(No Model.)
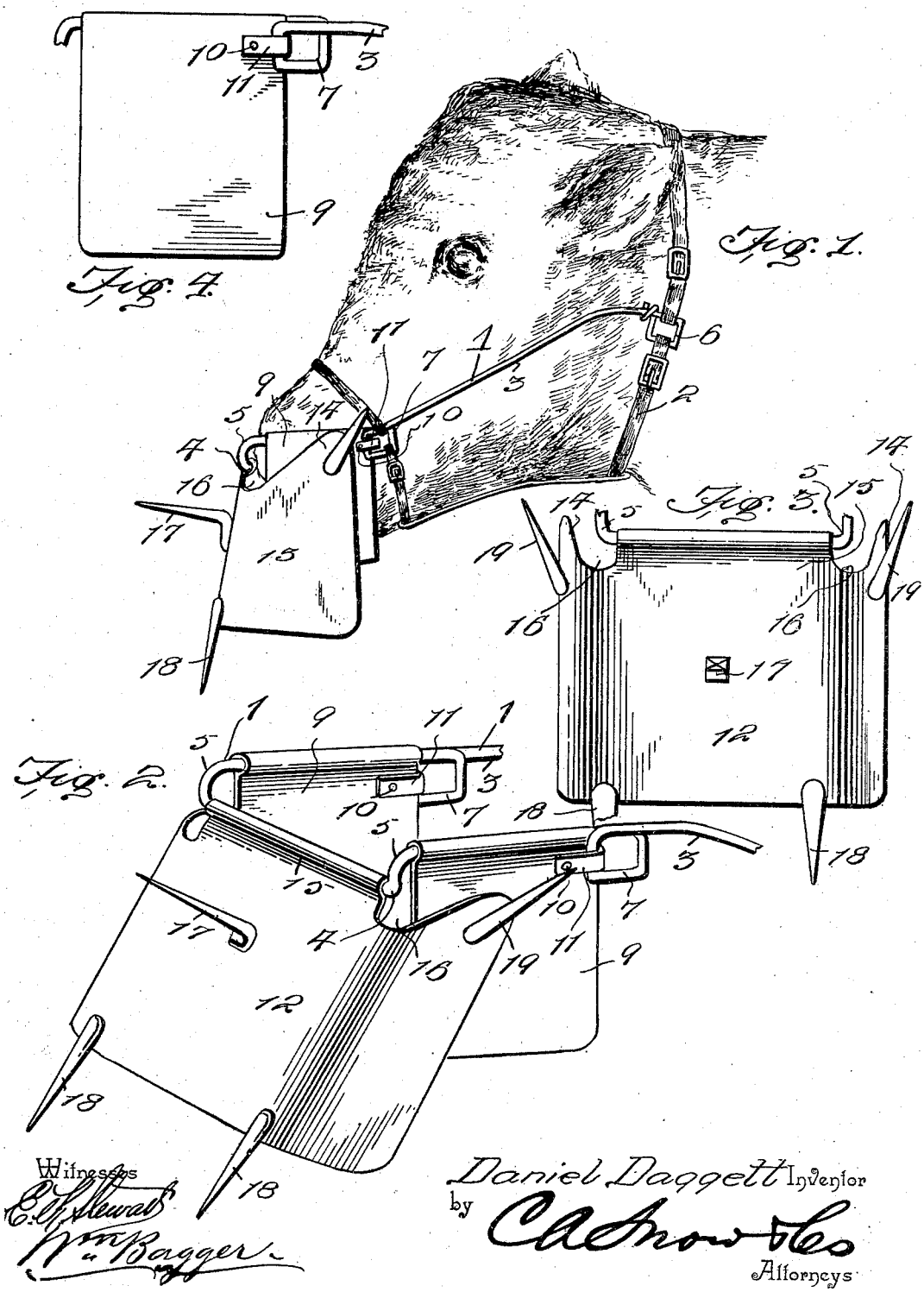
Daniel Daggett, Inventor

UNITED STATES PATENT OFFICE.

DANIEL DAGGETT, OF LEXINGTON, NEBRASKA.

CALF-WEANER.

SPECIFICATION forming part of Letters Patent No. 709,140, dated September 16, 1902.

Application filed June 6, 1902. Serial No. 110,491. (No model.)

*To all whom it may concern:*

Be it known that I, DANIEL DAGGETT, a citizen of the United States, residing at Lexington, in the county of Dawson and State of Nebraska, have invented a new and useful Calf-Weaner, of which the following is a specification.

This invention relates to that class of devices which are known as "calf-weaners," and it is best described as being an improvement on the device for which Letters Patent of the United States No. 683,104 were granted to myself on the 24th day of September, 1901. In the patent referred to were comprised and claimed a peculiarly-constructed frame, a halter having connection with said frame, and a shield hinged at the front end of said frame and adapted to cover the muzzle of the animal to which the device was applied, so as to prevent it from sucking. My present invention contemplates the addition to said device of side shields connected with the frame adjacent to the sides of the front shield, a change in the shape of the said front shield, and the mounting upon the said front shield of prongs or bars, all for the purpose of rendering the device as a whole more efficient in operation, my purpose being to construct a device which, considered as a whole, shall be simple, durable, and thoroughly efficient to accomplish the object for which it is intended.

In the drawings hereto annexed, Figure 1 is a perspective view showing my invention applied to the head of a calf in position for operation. Fig. 2 is a perspective view showing the device detached. Fig. 3 is a front view of the front shield and the adjacent portion of the frame upon which it is hinged. Fig. 4 is a side view of one of the side shields and adjacent frame portions.

Corresponding parts in the several figures are indicated by like characters of reference.

1 designates the frame, and 2 the halter, both of which are constructed in the manner shown in my Letters Patent above referred to and detailed description of which is not necessary in the present case, except so far as the said parts coöperate with the parts that constitute my present invention. I shall therefore briefly state that the frame is constructed, preferably, of wire bent so as to form the sides 3 3, connected by the front portion 4, adjacent to which are formed shoulders 5 5, depending from the front ends of the sides 3. The latter are formed with loops, as 6, at the rear ends thereof and with loops 7 intermediate between the ends thereof, whereby connection is had with the straps composing the halter. The loops 7, which are formed comparatively close to the front ends of the sides, 3 are made of an approximately rectangular shape for the convenient connection therewith of the halter-straps. The said loops are also preferably formed with their sides approximately at right angles to the parts of the frame portions 3 adjacent thereto, as will be clearly seen in Figs. 2 and 4 of the drawings. Upon the sides 3 of the frame, between the said loops 7 and the downwardly-extending shoulders 5, I mount the side shields 9, which are preferably constructed of sheet metal, with their upper edges bent so as to inclose the said portions of the frame-pieces 3 lying between the loops 7 and the shoulders 5. Suitably attached to the shields 9 by means of rivets 10 or in any other convenient way are the metallic staples or keepers 11, which inclose the adjacent sides of the rectangular loops 7, with which the said side shields are in this manner firmly connected. It will be seen that by this construction the side shields 9 have practically rigid connection with the frame of the device, a lateral or swinging movement being prevented by the keepers 11 engaging the loops 7.

The front shield 12, which, as is the case in my patent above referred to, is mounted upon the front cross-bar 4 of the frame in such a manner as to swing freely upon the same, is provided with the rearwardly-extending side pieces 13. In my former patent, however, the said side pieces have straight upper edges. By my present improvement I desire to extend the upper edges of said side pieces upwardly in a rearward direction, so as to form the wings 14, which, even when front shield swings outwardly when the device is in position for operation, as shown in Fig. 1, will extend somewhat over the side shields 9, and thereby positively and effectually prevent side sucking. The central portion of the front shield 12, which is bent at 14, so as to inclose the front bar 4 of the frame and form a hinge connection therewith, is extended upwardly from the body of said shield, as shown at 15 in Figs. 2 and 3 of the drawings. It will be seen that by this construction recesses 16 are formed between the said extension 15 and the side pieces 13 of the shield, which will permit the same to swing freely and without being interfered with by the shoulder portions 5 of the frame. The front shield is provided with barbs or prongs 17 and 18, extending, respectively, in a forward and in a downward direction. Rearwardly-extending prongs 19 are also attached to the wings 14 of the sides 13 of said front shield.

The operation and advantages of this invention will be readily understood from the foregoing description, taken in connection with the description hereto annexed. By its use the proper feeding of the animal to which it is applied will not be interfered with, while sucking will be positively prevented.

The device, it should be stated, is applicable not only to calves that are to be weaned, but equally to cows that are in the habit of sucking themselves; and it will be observed that the prongs or barbs of the device have been so arranged that there is no position to which the animal wearing the muzzle could possibly turn herself or the muzzle but what at least one of the barbs would be pointed directly toward herself, thus positively and absolutely preventing sucking.

Having thus described my invention, I claim and desire to secure by Letters Patent of the United States—

1. In a device of the class described, the combination with the frame the sides whereof have downwardly-extending shoulders connected by a front cross-piece, of a shield hinged upon said cross-piece and side shields having rigid connection with the side pieces adjacent to the shoulders thereof, substantially as set forth.

2. In a device of the class described, the combination with the frame the sides whereof have downwardly-extending shoulders connected by a front cross-piece, and loops formed at a distance from said shoulders, of a shield hinged upon said cross-piece, and side shields mounted upon the sides of the frame adjacent to the shoulders thereof and connected rigidly with the loops, substantially as set forth.

3. In a device of the class described, the combination with the frame the sides whereof have downwardly-extending shoulders connected by a front cross-piece, and loops formed at a distance from said shoulders, of a shield hinged upon said cross-piece, and side shields mounted upon the sides of the frame between the shoulders and the loops thereof and having rigid connection with said loops by means of staples or keepers engaging the same, substantially as set forth.

4. In a device of the class described the combination with the frame the sides whereof have downwardly-extending shoulders connected by a front cross-piece, and loops formed at a distance from said shoulders, of a shield hinged upon said cross-piece and having rearwardly-bent sides formed with upwardly and rearwardly extended upper edges, and side shields mounted upon the side bars of the frame, between the shoulders and the loops thereof and having keepers or staples engaging the same to form a rigid connection therewith, the said parts being relatively so disposed that when the front shield swings forwardly the wings or extensions of the sides thereof shall partially extend over the said side shields, substantially as set forth.

5. The combination with the frame having downwardly-extending shoulders connected by a front cross-bar, and formed with approximately rectangular loops at a distance from said shoulders, of the depending shields mounted upon said frame between said shoulders and rectangular loops, and staples or keepers, inclosing the adjacent sides of said rectangular loops and shields and having rigid connection with the latter, substantially as set forth.

6. The combination with the frame having downwardly-extending shoulders connected by a front cross-bar and formed with loops at a distance from said shoulders, of the side shields mounted upon the said frame between said shoulders and loops and having rigid connection with the latter, and the front shield hinged upon the front cross-bar and having sides provided with rings or extensions overlapping said side pieces, and prongs or barbs attached to said front shield, substantially as set forth.

7. The combination with the frame having downwardly-extended shoulders connected by a front cross-bar, and side shields mounted upon said frame, adjacent to said shoulders and having rigid connection with said frame, of the front shield having an upwardly-extended central portion having hinge connection with the front cross-bar and rearwardly-extending side pieces the upper edges of which are extended upwardly and rearwardly to form wings, substantially as set forth.

In testimony that I claim the foregoing as my own I have hereto affixed my signature in the presence of two witnesses.

DANIEL DAGGETT.

Witnesses:
S. W. SCHOOLEY,
E. H. NEUENS.